United States Patent
Bensberg et al.

(10) Patent No.: US 11,106,698 B2
(45) Date of Patent: Aug. 31, 2021

(54) MULTI-MASTER WITH OWNERSHIP TRANSFER

(71) Applicant: SAP SE, Walldorf (DE)

(72) Inventors: Christian Bensberg, Heidelberg (DE); Stefan Baeuerle, Rauebberg-Rotenberg (DE)

(73) Assignee: SAP SE, Walldorf (DE)

( * ) Notice: Subject to any disclaimer, the term of this patent is extended or adjusted under 35 U.S.C. 154(b) by 175 days.

(21) Appl. No.: 16/437,852

(22) Filed: Jun. 11, 2019

(65) Prior Publication Data
US 2020/0394209 A1    Dec. 17, 2020

(51) Int. Cl.
*G06F 16/27*    (2019.01)

(52) U.S. Cl.
CPC .......... *G06F 16/278* (2019.01); *G06F 16/273* (2019.01)

(58) Field of Classification Search
CPC .................................................. G06F 16/278
USPC ........................................................ 707/803
See application file for complete search history.

(56) References Cited

U.S. PATENT DOCUMENTS

| | | | | |
|---|---|---|---|---|
| 2011/0228770 | A1* | 9/2011 | Dholakia | H04L 12/18 370/390 |
| 2014/0025898 | A1* | 1/2014 | Iyengar | G06F 12/123 711/130 |
| 2015/0370883 | A1* | 12/2015 | Kalki | G06F 21/6236 707/600 |
| 2017/0351462 | A1* | 12/2017 | Fan | G06F 3/065 |
| 2018/0247384 | A1* | 8/2018 | Gilmore | G06Q 10/103 |
| 2019/0361917 | A1* | 11/2019 | Tran | G06F 16/28 |
| 2020/0174671 | A1* | 6/2020 | Margaglia | G06F 11/1076 |

* cited by examiner

*Primary Examiner* — Syling Yen
(74) *Attorney, Agent, or Firm* — Mintz Levin Cohn Ferris Glovsky and Popeo, P.C.

(57) ABSTRACT

A method, a system and a computer program product for executing management of ownership of data. An index in a plurality of indexes is selected. The index corresponds to a plurality of ranges of data values stored in a plurality of database slices of a database. The index further corresponds to a partitioning structure that includes a plurality of hierarchically arranged nodes. Each node corresponds to a range of data values stored in at least one database slice. The structure is replicated across a plurality of computing systems. A computing system executes an update to one or more ranges of data values. The system replicates at least one of a database slice including the updated ranges of data values and a node that includes the updated ranges of data values to another computing system for storage of a replicate of the updated ranges of data values.

20 Claims, 12 Drawing Sheets

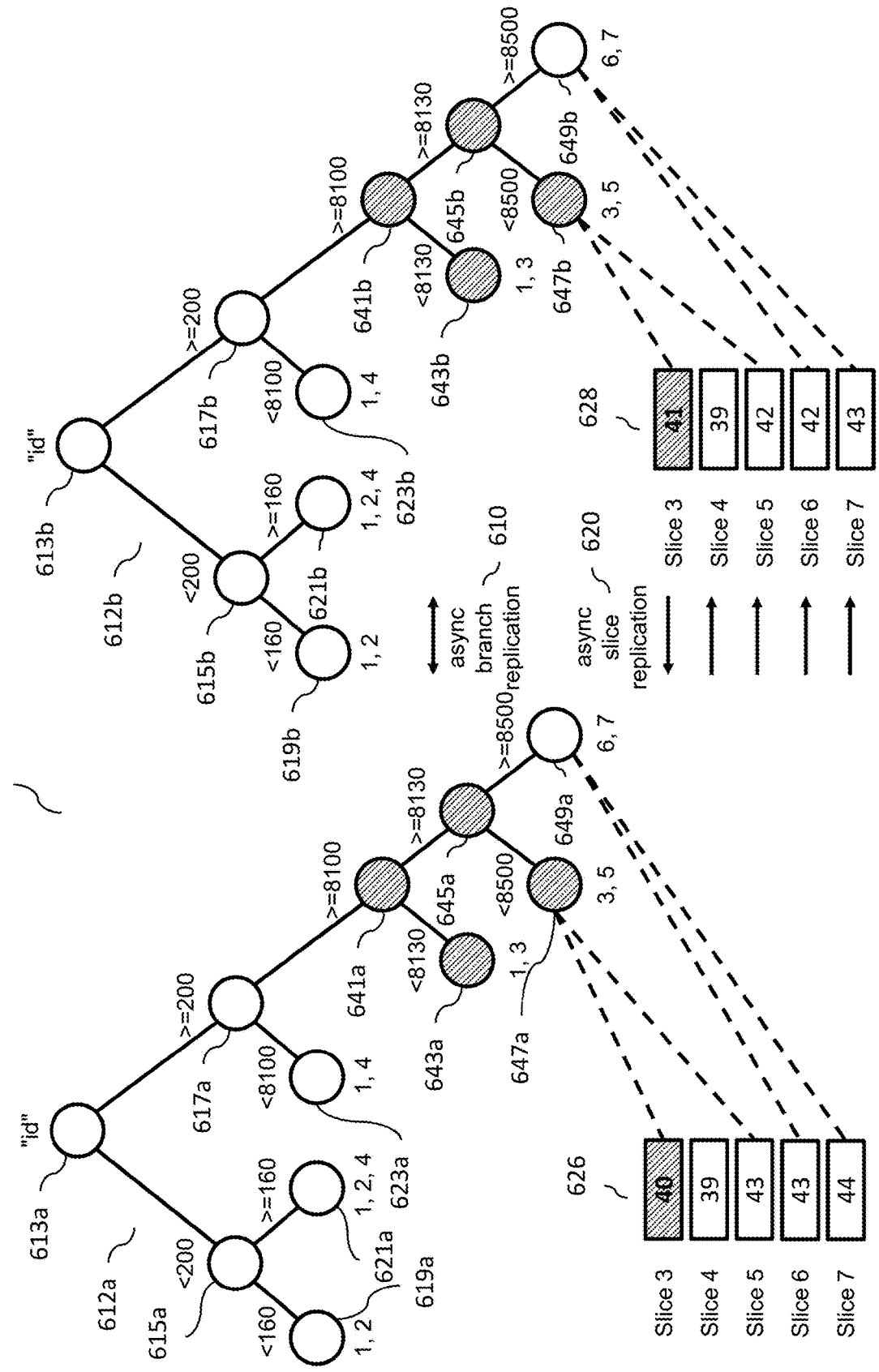

MULTI-MASTER WITH OWNERSHIP TRANSFER

TECHNICAL FIELD

This disclosure relates generally to data processing and, in particular, to multi-master data management, including ownership transfer of one or more data partitions.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Data stored by such systems may be stored in one or more partitions. Given the complexity of queries, volume of data stored, and/or their volume, the underlying databases face challenges in order to optimize performance.

SUMMARY

In some implementations, the current subject matter relates to a computer implemented method for executing management of ownership of data. The method may include selecting an index in a plurality of indexes. The index may correspond to a plurality of ranges of data values stored in a plurality of database slices of a database. The index further may correspond to a partitioning structure including a plurality of hierarchically arranged nodes. Each node may correspond to a range of data values in the plurality of ranges of data values stored in at least one database slice. The partitioning structure may be replicated across a plurality of computing systems. The method may further include executing, by a computing system in the plurality of computing systems, an update to one or more ranges of data values, and replicating, by the computing system, at least one of: a database slice including the updated one or more ranges of data values and a node including the updated one or more ranges of data values, to another computing system in the plurality of computing systems for storage of a replicate of the updated one or more ranges of data values.

In some implementations, the current subject matter can include one or more of the following optional features. In some implementations, the replication may include replicating the node including the updated one or more ranges of data values to the other computing system based on a number of updates to the one or more ranges of data values being greater than a predetermined threshold number of updates.

In some implementations, the update execution may include generating another database slice configured to store the updated one or more ranges of data values. The method may further include replicating, by the computing system, the generated another database slice to the other database system. The method may also include storing the generated other database slice by another computing, executing, by another computing system, an update to one or more ranges of data values in another database slice, and replicating, by another computing system, another database slice to the computing system and storing a replica of the updated one or more ranges of data values in another database slice by the computing system.

In some implementations, one or more slices in the plurality of slices may be configured to be owned by one or more computing systems in the plurality of computing systems independently of one or more nodes in the plurality of hierarchically arranged nodes. Ownership of one or more slices may be configured to be transferred independently of ownership of one or more nodes by one or more computing systems.

In some implementations, the replication may include an asynchronous replication.

In some implementations, execution of an update may include at least one of the following: an insertion of the update to one or more ranges of data values into one or more database slices, modification of data stored in one or more database slices using the update to one or more ranges of data values, deletion of data one or more database slices, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 6a-c illustrate an exemplary multi-master data management system, according to some implementations of the current subject matter;

DETAILED DESCRIPTION

Figure 1:
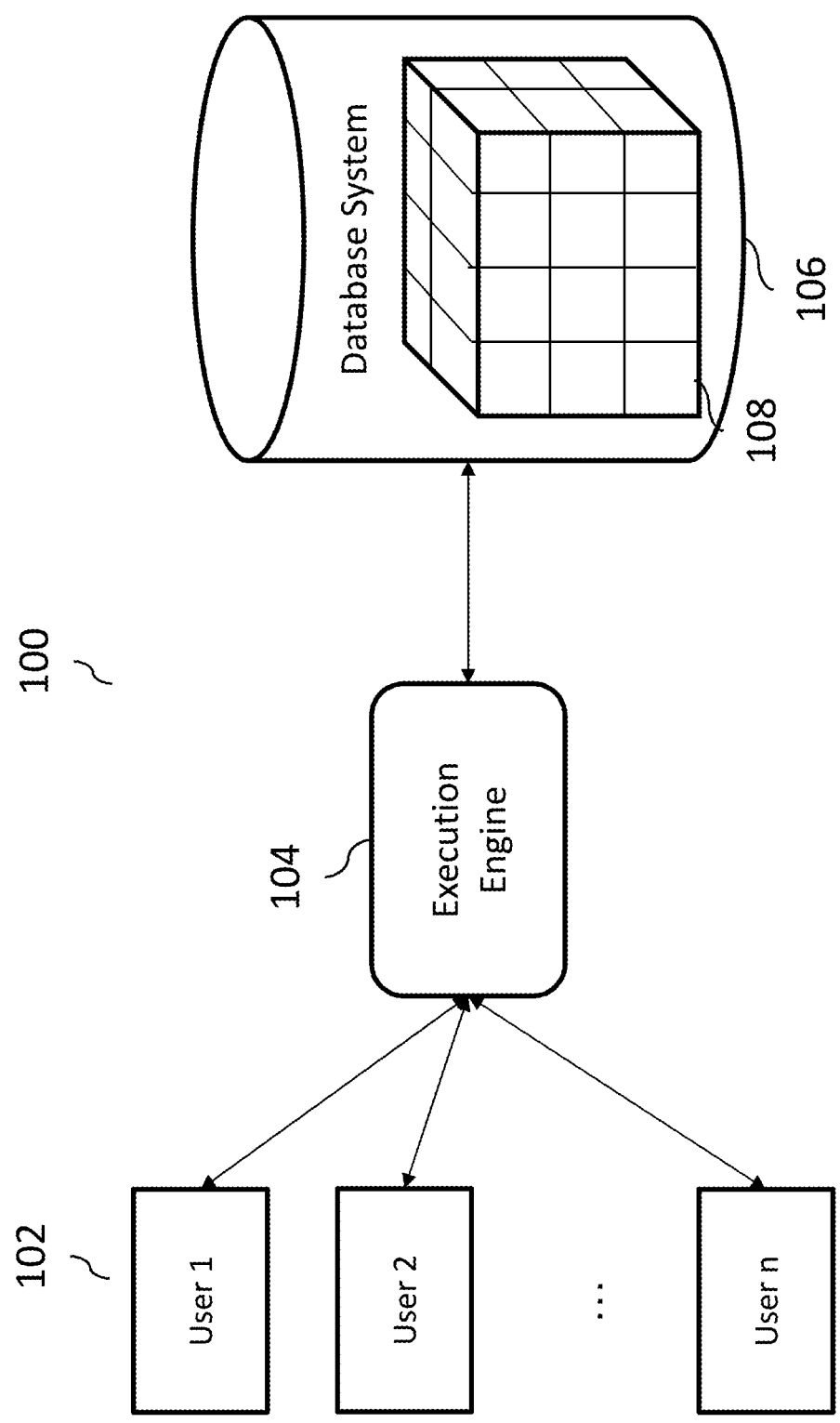
FIG. 1 illustrates an exemplary system for multi-master data management, according to some implementations of the current subject matter.

To address these and potentially other deficiencies of currently available solutions, one or more implementations of the current subject matter relate to methods, systems, articles of manufacture, and the like that can, among other possible advantages, provide multi-master data management, including ownership transfer of one or more data partitions.

Database management systems and operations performed on the data managed by a database management system have become increasingly complex. For example, a database management systems (or database for short) may support relatively complex online analytical processing (OLAP, which may perform multi-dimensional analysis) to more straightforward transaction based online transaction processing (OLTP). Moreover, the database may be configured as a row store database or column store database, each of which may have certain aspects with respect to queries and other operations at the database. For example, the database may encode data using dictionaries, while some databases may not. In addition to these various databases layer differences, the queries performed at a database may include a complex sequence of operations in order to generate corresponding responses. To implement the complex sequence, a query execution plan (or query plan for short) may be implemented. The query plan may represent a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer may need to be configured to handle the various types of databases and various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

Database systems may store data using one or more partitioning configurations. A partition in a database may refer to a division of a logical database or its elements into separate independent parts. Partitioning allows improved manageability, performance, load balancing, etc. In some cases, partitions may be distributed over multiple nodes, where each node may allow users to perform various operations (e.g., execution of transactions, etc.) on a partition. Such distribution may increase performance for nodes that may be subject to frequent transactions that may involve retrieval, insertion, modification, generation of views of data, etc. while at the same time maintaining availability and security of data. Data partitioning may be performed by building separate smaller databases, splitting selected elements, etc. Data may be partitioned using horizontal or vertical partitioning methodologies. A horizontal partitioning may place different rows into different tables (e.g., splitting users of different age groups). A vertical partitioning may create new tables having fewer columns and may use additional tables to store any remaining columns.

In some implementations, the current subject matter may be configured to generate a partitioning specification for data that may be stored in a database system. The partitioning specification may be defined "on the fly" using slices of data that are included in the database and/or its partitions (it may be assumed that the data stored in the database is implicitly partitioned). The current subject matter may generate a partition specification using a tree structure, where nodes in a tree may correspond to specific data slices in the database. Data slices may be relatively small. This way, if a partitioning scheme is not ideal, there is no major drawback in terms of performance as the processing of small slices may be relatively quick. One of the advantages of this approach is that no costly re-organizations of data may be required.

In some implementations, one or more partitions of a database(s) may be located or stored on one or more servers that may be disposed at different locations (e.g., in different geographical regions). Servers may "own" a particular partition of data, such as, for example, by virtue of the partition being created and stored on that server, more frequently accessed on that server (e.g., users that are more frequently accessing a particular partition are located geographically proximate to the server). However, in some cases, ownership of partitions may need to be transferred (e.g., temporarily, permanently, etc.) from one server to another server. This may be done for the purposes of providing updates, performing transactions local to the other server, executing writes that may be local to that server, etc. In some exemplary implementations, once the other server completes the tasks, it may transfer the ownership of the partition back to the original server. In some implementations, ownership of an entire partition may be transferred. Alternatively, only a portion of a partition (e.g., a "branch" of a tree, as will be discussed below) may be transferred.

FIG. 1 illustrates an exemplary system 100 for multi-master data management, according to some implementations of the current subject matter. The system 100 may include one or more users (user 1, user 2, . . . user n) 102, an execution engine 104, and a database system 106, which may store data in one or more slices 108. The users 102, the execution engine 104, and the database system 106 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 106 may include at least one of the following: databases, storage locations, memory locations, column stores, document stores, and/or any combination of hardware and/or software components. In some implementations, the database system 106 may be a High Performance Analytic Appliance ("HANA") system as developed by SAP SE, Walldorf, Germany, as will be described below.

The execution engine 104 may include any combination of software and/or hardware components and may be configured to receive and execute a query from one or more users 102 to obtain data from one or more slices 108 in the database system 106, insert data into from one or more slices 108 the database system 106, modify data stored from one or more slices 108 in the database system 106, delete data stored from one or more slices 108 in the database system 106, generate one or more new slices 108 (e.g., for insertion of new data), etc., and any combination thereof. In some implementations, the execution engine 106 may be included in the database system 106.

Execution of a query may typically require generation of a query plan or query execution plan, which may be an ordered set of operations that may be used to access stored data (e.g., access data in a SQL relational database management system). Upon submission of a query to the database system 106, requested data may be retrieved based on parameters of the query. The retrieved data may be aggregated/joined with any other data that may be sought by the user. Insertion, modification, deletion, etc. of data in the database system 106 may be performed using various SQL or other statements.

Figure 2:
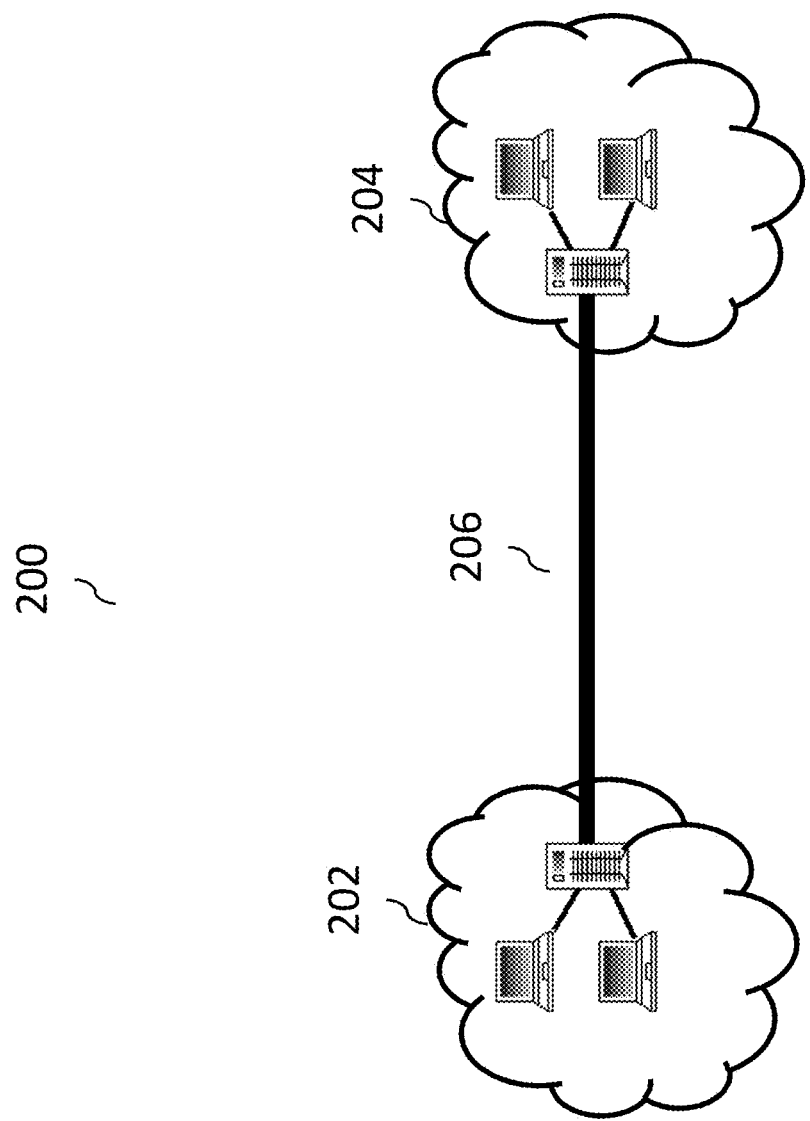
FIG. 2 illustrates an exemplary multi-master data management system, according to some implementations of the current subject matter.

FIG. 2 illustrates an exemplary multi-master data management system 200, according to some implementations of the current subject matter. The system 200 may include a first computing system 202 and a second computing system 204 communicatively coupled via a networking connection 206. The systems 202, 204 may include at least one of the following: one or more servers, one or more computing users, one or more databases, one or more memory locations, computer processors, computing networks, software applications, servers, user interfaces, and/or any combination of hardware and/or software components, and/or any other computing components. The communication link 206 may include any type of network, including but not limited to, wired, wireless, and/or a combination of both. The databases that may be disposed at the systems 202, 204 may include at least one of the following: any storage locations, any memory locations, any column stores, any document stores, and/or any combination of hardware and/or software components.

The systems 202, 204 may be configured to perform local transactions on data that may be stored in either of the systems. This may include any updates, deletions, modifications, writes, etc. of such data. Each system may own (either temporarily, permanently, etc.) any data that is being accessed by the users of the system. In some implementations, ownership of data may be transferred from one system to another. Ownership of data may be transferred for a specific partition (e.g., a slice) of data, a portion of the specific partition (e.g., a branch of a tree in a partition specification). In some implementations, once the ownership of the data is transferred, the receiving system may become the new owner of that data until it is requested or may be determined that the ownership may need to be transferred back to the system that initially owned that data. Alternatively, the system that may provide update may never own the data from another system but instead, simply provide any requisite updates to the data.

Figure 3:
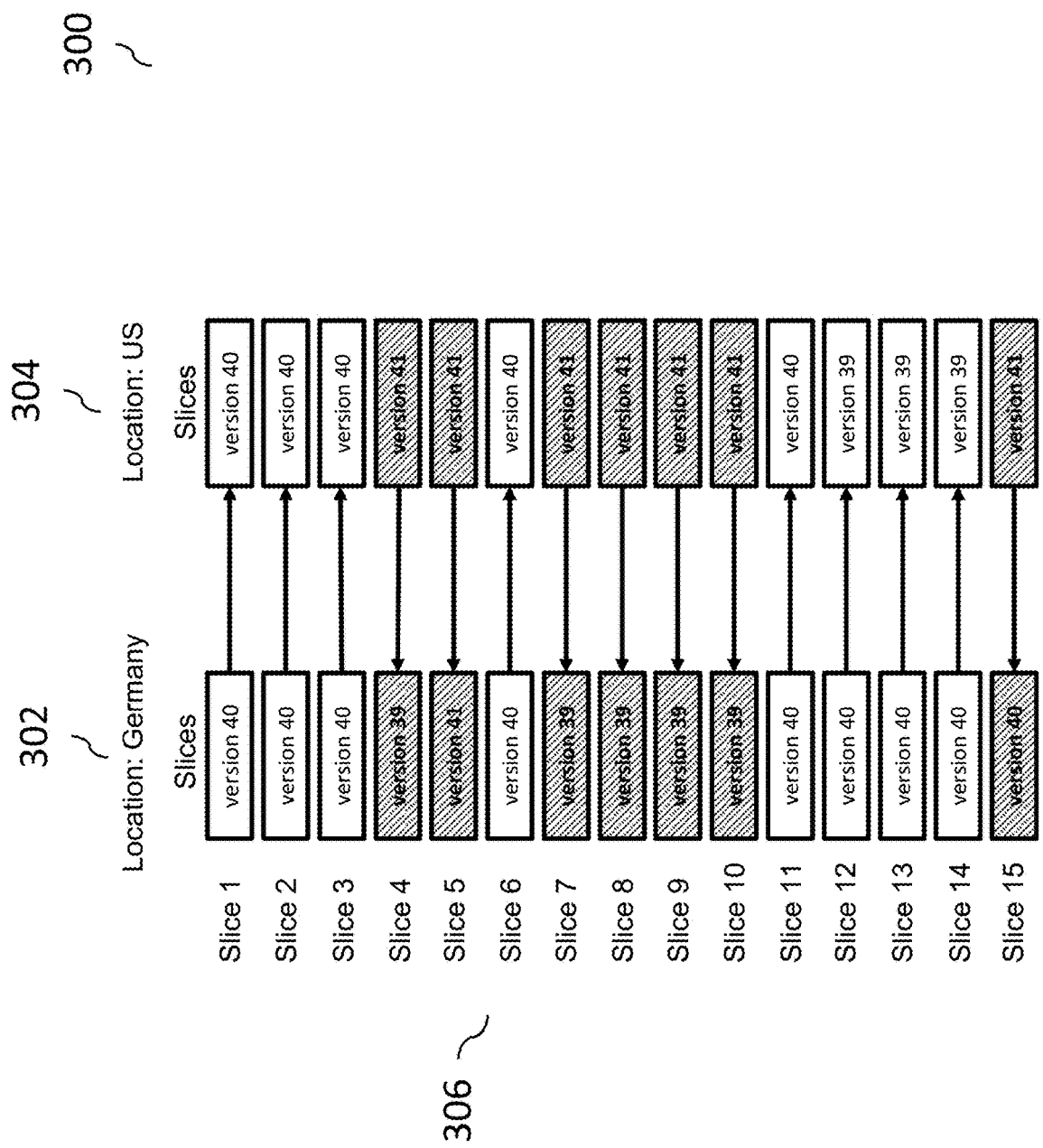
FIG. 3 illustrates another exemplary multi-master data management system, according to some implementations of the current subject matter.

FIG. 3 illustrates another exemplary multi-master data management system 300, according to some implementations of the current subject matter. The system 300 may be similar to the system 200 shown in FIG. 2. The system 300 may include a first system 302 (e.g., similar to system 202 (shown in FIG. 2) and located in Germany) communicatively coupled to a second system 304 (e.g., similar to system 204 (shown in FIG. 2) and located in the United States). Each system may store one or more slices (or partitions) 306 of data. Each location may also "own" a particular slice of data (and/or its version). As shown in FIG. 3, slices of data that are not shaded may be owned by the system 302 and slices that are shaded may be owned by the system 304.

Each slice of data may also have an appropriate version of that slice associated with it. For example, slice 1, owned by the location 302 may have a "version 40" associated with it. If an update is provided by the system 302 to slice 1's version 40, such update may be communicated (as indicated by an arrow) to the corresponding slice 1's version stored at the system 304 (as shown by updates to slices 12-14 to version 40 stored at system 302 that are communicated to update corresponding slice versions 39 stored at system 304). Similarly, any updates to slices owned by and executed at system 304 may be communicated to the corresponding slices at system 302 (as shown by updates to slice 4, 7-10 and 15). As stated above, updates may be performed to specific slices and/or portions of slices. Such updates may allow users to operate (e.g., update, write, etc.) on different portions of the same slice or table (which may be replicated across both systems), whereby two separate systems 302, 304 may logically appear as a single system.

Figure 4:
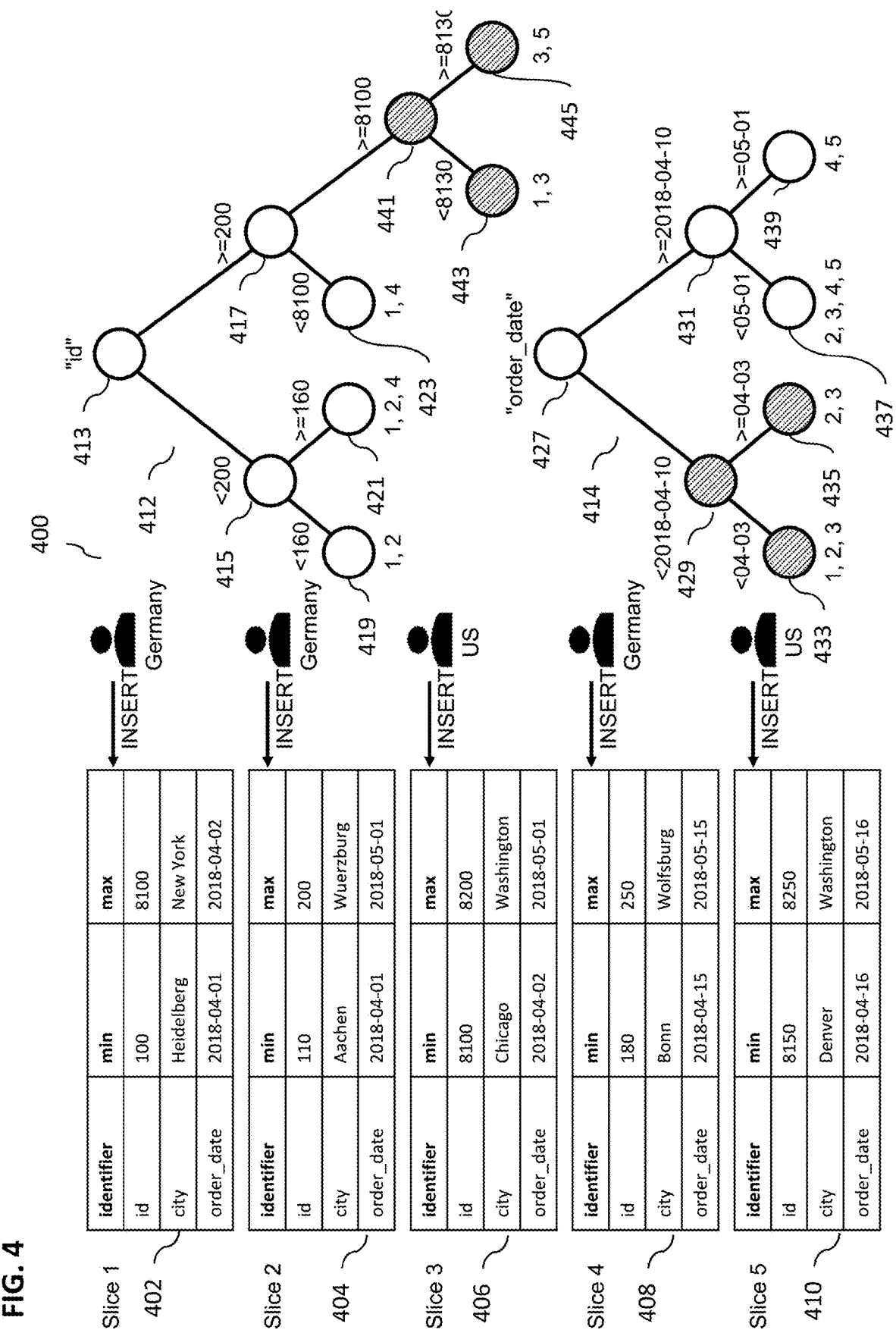
FIG. 4 illustrates exemplary partitioning specifications, according to some implementations of the current subject matter.

FIG. 4 illustrates exemplary partitioning specifications 412 and 414 (e.g., in the form of tree structures) that have been generated together with slices 1-5 402-410. As shown in FIG. 4, slices 402-405 may be tables that may include an index. For example, slice 1 402 may include an identifier column along with minimum ("min") and maximum ("max") value columns. The identifier column may include an "id", "city" and "order_date". Each of these include a range of values, for example, the "id" identifier may include a range of "100-8100", the "city" identifier may include a range of "Heidelberg-New York", and the "order_date" identifier may include a range of "2018-04-01-2018-04-02".

Similarly, slice 2 404 may include different ranges for its identifiers. For example, the "id" identifier range may be "110-200"; the "city" identifier may include a range of "Aachen-Wuerzburg", and the "order_date" identifier may include a range of "2018-04-01-2018-05-01". In slice 3 406, the "id" identifier may include a range of "8100-8200", the "city" identifier may include a range of "Chicago-Washington", and the "order_date" identifier may include a range of "2018-04-02-2018-05-01". In slice 4 408, the "id" identifier may include a range of "180-250", the "city" identifier may include a range of "Bonn-Wolfsburg", and the "order_date" identifier may include a range of "2018-04-15-2018-05-15". Lastly, in slice 5 410, the "id" identifier may include a range of "8150-8250", the "city" identifier may include a range of "Denver-Washington", and the "order_date" identifier may include a range of "2018-04-16-2018-05-16". In some implementations, as a consequence of the implicit partitioning, data may be arranged in a way that slices may contain data that may highly correlate respectively and, hence, implicitly organized by subject matter (e.g., slices 2 and 4 may include data related to orders in Germany; slices 3 and 5 may include data related to orders in the United States, and slice 1 may include all data relating to orders in the United States and Germany).

In some implementations, the slices may be used to generate a partition specification (e.g., trees 412 and 414) where data may be organized based on ranges identified in the slices in accordance with the identifiers. The partition specifications may be used for insertion, retrieval, modification, deletion, etc. of data stored in the slices. Additionally, these specifications may be used for creation of new slices of data, if necessary or desired. In some implementations, the slices and the partition specification may grow simultaneously and may influence one another based on actual data value ranges that may be inserted. The latter may cause generation of slices, whereby, within each slice, correlation between one or more identifiers/fields (e.g., "id") may be high.

As shown in FIG. 4, the tree 412 may be hierarchically organized based on the identifier "id" in the slices 1-5, with the identifier "id" being a parent node 413 and may be linked to one or more child nodes. For example, the "id" parent node 413 may be linked to a node 415 corresponding to "id" being in a range of less than 200 ("<200") and a node 417 corresponding to "id" being in a range of greater than or equal to 200 ("≥200"). As can be understood, any other number or numbers may be used for generation of a partitioning specification based on this tree. Further, more than one node may be linked to the parent node 413.

The node 415 may be further linked to child nodes 419 and 421, where node 419 may include data corresponding to "id" identifier being less than 160 ("<160") and node 421 may include data corresponding to "id" identifier being greater than or equal to 160 ("≥160"). Further, node 417 may be linked to child nodes 423 and 441, where the child node 423 may include data corresponding to "id" identifier being less than 8100 ("≤8100") and node 441 may include data corresponding to "id" identifier being greater than or equal to 8100 ("≥8100"). Further, the node 441 may include its own child nodes 443 (values less than 8130) and 445 (values greater than or equal to 8130).

Based on this partitioning, node 419 may correspond to some or all of the data in slices 1, 2; node 421 may correspond to some or all of the data in slices 1, 2, 4; node 423 may correspond to some or all of the data in slices 1 and 4; node 443 may correspond to some or all of the data in slices 1 and 3; and node 445 may include one or more data values in slices 3 and 5.

The data values (or ranges of data values) corresponding to nodes in the tree 412 may be owned by different systems (e.g., systems 302 (Germany), 304 (United States) shown in FIG. 3). As shown in FIG. 4, data values corresponding to nodes 413, 415, 417, 419, 421 and 423 may be owned by the Germany system 302, whereas data values corresponding to nodes 441, 443, and 445 may be owned by the United States system 304.

Similarly, the tree 414 may be hierarchically organized based on the identifier "order_date" in the slices 1-5, with the identifier "order_date" being a parent node 427. The "order_date" parent node 427 may be linked to nodes 429 and 431, where node 429 including data corresponding to "order_date" being in a range of less than 2018-04-10 ("<2018-04-10") and node 431 corresponding to "order_date" being in a range of greater than or equal to 2018-04-10 ("≥2018-04-10"). As can be understood, any other order date or dates may be used for generation of a partitioning specification based on this tree and/or more than one node may be linked to the parent node 427.

The node 429 may be further linked to child nodes 433 and 435, where node 433 may include data corresponding to "order_date" identifier being less than 2018-04-03 ("<2018-04-03") and node 435 may include data corresponding to "order_date" identifier being greater than or equal to 2018-04-03 ("≥2018-04-03"). Further, node 431 may be linked to child nodes 437 and 439, where the child node 437 may include data corresponding to "order_date" identifier being less than 2018-05-01 ("<2018-05-01") and node 439 may include data corresponding to "order_date" identifier being greater than or equal to 2018-05-01 ("≥2018-05-01").

Based on this partitioning, node 433 may correspond to some or all of the data in slices 1, 2 and 3; node 435 may correspond to some or all of the data in slices 2 and 3; node 437 may correspond to some or all of the data in slices 2, 3, 4 and 5; and node 439 may correspond to some or all of the data in slices 4 and 5. Similar to the partitioning tree 412, the data values (or ranges of data values) corresponding to nodes in the tree 414, may be owned by different systems shown in FIG. 3. For example, data values corresponding to nodes 427, 431, 437, and 439 may be owned by the Germany system 302 and data values corresponding to nodes 429, 433, and 435 may be owned by the United States system 304.

In some implementations, slices 1-5 may receive various updates, e.g., data inserts, data deletions, data modifications, etc. For example, a typical insertion of data may be executed using an INSERT statement (e.g., INSERT {"id": 100, "city": "Heidelberg", "order_date": "2018-04-01"}). Such inserts may be performed based on a location corresponding to the location that owns the data (e.g., an insert into slice 2 owned by the Germany system 302), by a location that does not own the data (e.g., an update may be performed on a replica of a slice or a portion of a slice), and/or by both locations.

Figure 5:
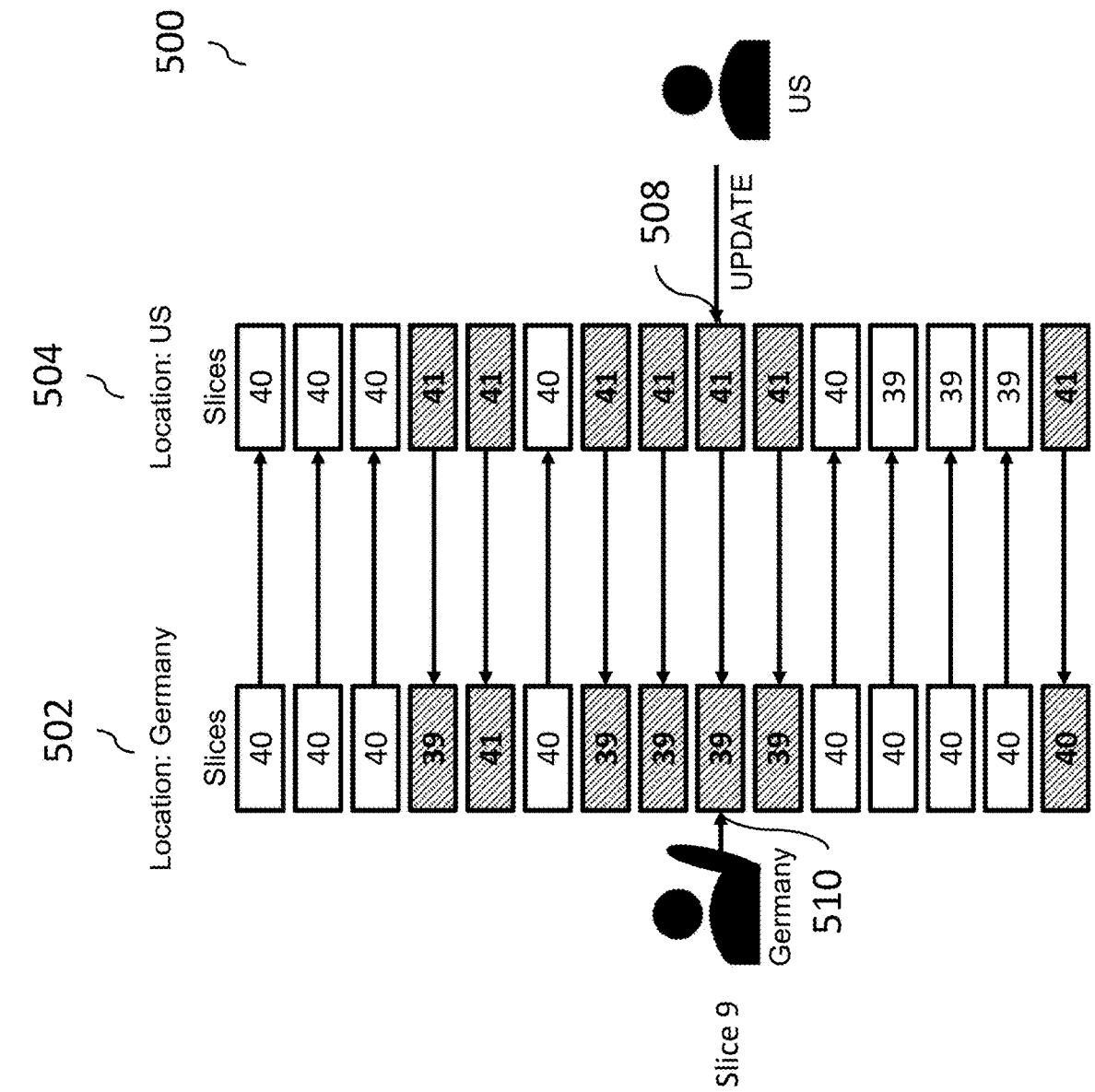
FIG. 5 illustrates another exemplary multi-master data management system, according to some implementations of the current subject matter.

FIG. 5 illustrates another exemplary multi-master data management system 500, according to some implementations of the current subject matter. The system 500 may be similar to the systems 200 and 300 shown in FIGS. 2, 3, respectively. The system 500 may include a first system 502 (e.g., similar to system 302 (shown in FIG. 3) and located in Germany) communicatively coupled to a second system 504 (e.g., similar to system 304 (shown in FIG. 3) and located in the United States). Likewise, each system may own one or more slices (or partitions) of data. As shown in FIG. 5, slices of data that are not shaded may be owned by the system 502 and slices that are shaded may be owned by the system 504.

As shown in FIG. 5, an update may be requested by a user connected to the Germany system 502 to a slice 9 of the data. It may be determined that slice 9 is owned by the United States system 504 (as shown by the shaded box). The update request may be sent to the system 504 for actual execution. An update may include generation of a new version of the slice (e.g., "version 41"). The system 500 may further determine that the system 502 may include an older version of the slice 9 (e.g., "version 39") and hence, the system 504 may replicate the updated version (i.e., "version 41") to the system 502 for storage. This way a remote system may perform updates to data that it does not own—by letting the owner perform the actual operation. It is the responsibility of the owner to perform data checks, handle transactional snapshots etc.

In some implementations, the system 500 may use updating frequency by a system (e.g., how often a particular slice or its portion are being updated) to determine whether ownership of a particular version of a slice may need to be changed or retained with the original system. A threshold updating frequency may be used for such determination. By way of a non-limiting example, if an updating frequency of a slice is more than 500 updates per minute by a system, ownership of that slice (assuming it is not owned by the updating system) may be transferred to that system. Referring to FIG. 5, if slice 9 is being updated by the system 502 less than 500 times per minute, the ownership of slice 9 may be retained with system 504. Otherwise, it may be switched to system 502.

In some implementations, the system 500 may determine that ownership of slices is being switched too frequently (e.g., exceeding another threshold). In that case, the system 500 may determine that instead of switching slice ownership, an ownership of a particular branch of a tree partition (e.g., trees 412, 414 shown in FIG. 4) corresponding to a node in that branch that is being frequently updated may be switched (e.g., permanently, temporarily, etc.). Switching of branch ownership is further discussed in connection with FIGS. 6*a-c* below.

Figure 6A:
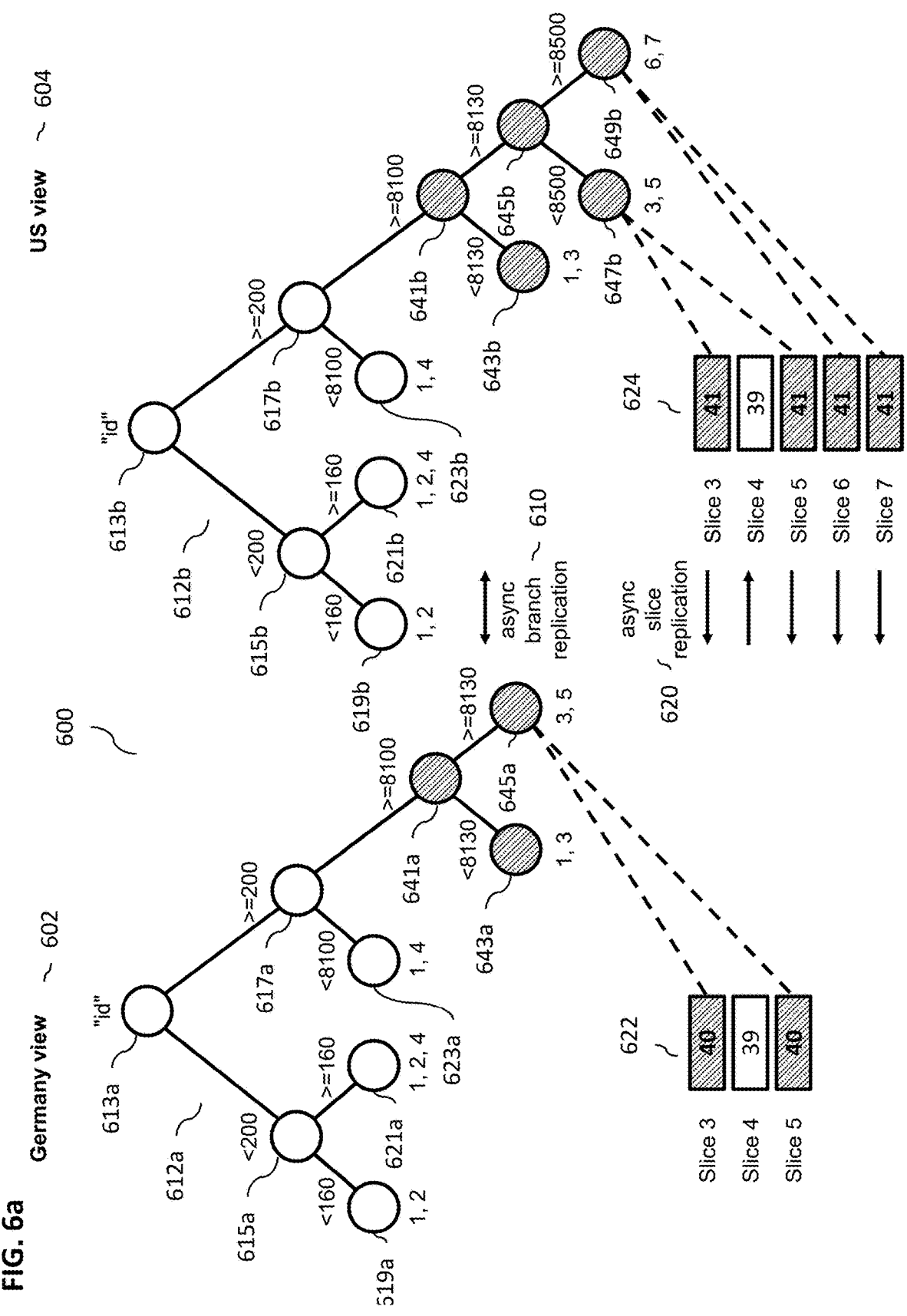
Figure 6B:
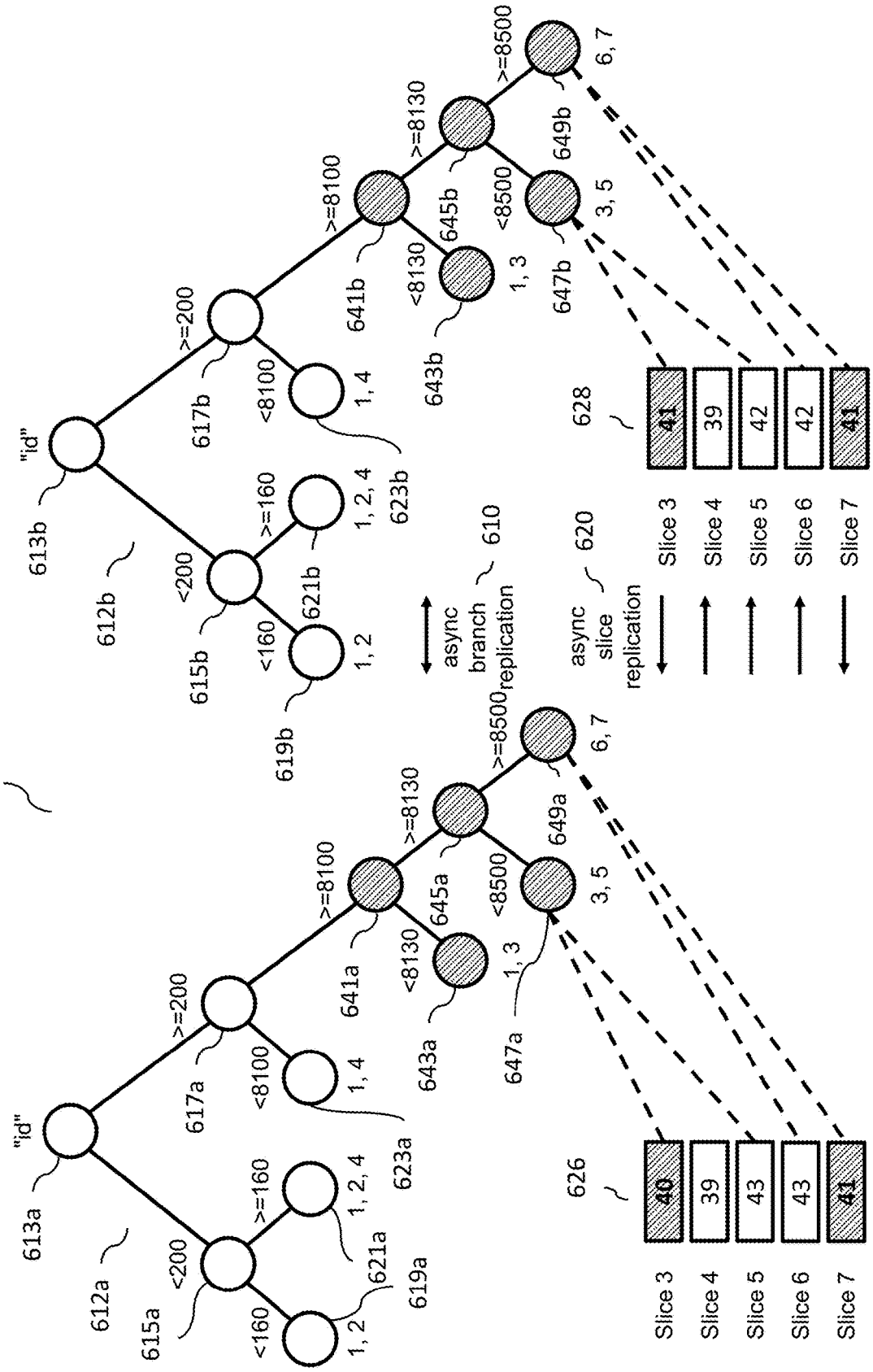

FIGS. 6*a-c* illustrate an exemplary multi-master data management system 600, according to some implementations of the current subject matter. In particular, FIGS. 6*a-c* illustrate "id" partition specifications similar to the "id" partition specification shown in FIG. 4 and that are based on slices 1-5 shown in FIG. 4. As shown in 6*a*, the system 600 may include a first system 602 (i.e., "Germany view") and a second system 604 (i.e., "US view"), which are similar to the corresponding systems shown in FIGS. 2-5. FIGS. 6*a-c* show respective system states at a particular point in time. Due to the asynchronous nature of the replication between the systems, they may have a different state at such points in time. These different states are illustrated as respective "views".

Each system 602, 604 may include a copy of the "id" partition specification or tree 612, i.e., system 602 may include tree 612*a* and system 604 may include tree 612*b*. As shown in FIG. 6*a*, the partition specification 612 may be owned by the system 602 (i.e., as shown by the unshaded circles). Each partition specification 612 may include a parent node 613 lined to child nodes 615 and 617, which, in turn, may be linked to further child nodes.

FIG. 6*a* illustrates an exemplary update (e.g., insertion) of data that may be performed by the system 604. In particular, as shown in FIG. 6*a*, the node 617*a* of the system 602 may be linked to a branch that includes a node 641*a* that is linked to two child nodes 643*a* and 645*a*. The branch headed by the node 641*a* may be owned by the system 604 (i.e., US system). The node 643*a* may include a range of data values less than 8130, corresponding to slices 1 and 3, and node 645*a* may include a range of data values greater than or equal to 8130, corresponding to slices 3 and 5. The slices 3 and 5, at the system 602, may correspond to version 40 of data values contained in these slices.

The system 604 may execute an update process by updating data values (e.g., inserting) in the branch headed by the node 645*b*. Specifically, two nodes 647*b* and 649*b* may be linked to the node 645*b*. The node 647*b* may correspond to data values being less than 8500 and node 649*b* may correspond to data values being greater than or equal to 8500. Node 647*b* may correspond to new ranges of data values that may be used to update existing ranges of data values with a new version (e.g., "version 41" in slices 3 and 5), as shown in FIG. 6*a*. Node 649*b* may correspond to new ranges of data values for which no previous data ranges or corresponding slices exist. Thus, new slices—slices 6 and 7—may need to be generated. The slices 6 and 7 may correspond to the new version of ranges of data values (i.e., "version 41").

As shown in FIG. 6*a*, to execute an update to the system 602 using data in system 604, an asynchronous branch and/or slice replication process may be executed. This may allow both systems to operate while the update process is undergoing. During the update to system 602, new branch data values (corresponding to node 647*b*) may be replicated to the system 602 from system 604 (as shown by the arrows in FIG. 6*a*). New slices 6 and 7 corresponding to node 649*b* may be asynchronously replicated to the system 602.

FIG. 6*b* illustrates an exemplary process for execution of a data update process by the system 602, which may occur after completion of the update process shown in FIG. 6*a*. As shown in FIG. 6, after the update process in FIG. 6*a* is completed, the system 602 may include nodes 645*a*, 647*a*, and 649*a* that may correspond to nodes (and hence range of data values) 645*b*, 647*b*, and 649*b* of system 604, respectively.

In some implementations, the system 602 may determine that an updated range of data values has been provided with respect to slices 5 and 6 (e.g., "version 43"). The updated range of data values may be asynchronously replicated to the system 604 (by reversing direction of the replication). Moreover, the update may cause the system 602 to assume ownership of slices 5 and 6, as shown by the unshaded slices. While the ownership of the slices has changed, it does not necessarily mean that the ownership of branches in the partitioning specification changes. As shown in FIG. 6*b*, the branches 641-649 remain owned by system 604. This means that system 602 may use values in the given ranges (even though they are owned by another system), but it may not extend ranges, add sub-nodes etc.

FIG. 6*c* illustrates an exemplary process of changing ownership of branches upon a determination that one system has updated more slices. This may occur when updates by one system (e.g., system 602) to a branch (or a node) (e.g., node 649) owned by another system (e.g., system 604) may exceed a predetermined threshold, where the threshold corresponds to a number of slices being updated (e.g., more than 50%) in a particular branch.

By a way of a non-limiting example, system 602 may execute updates to slices 6 and 7 with updated versions of ranges of data values (e.g., "version 43" for slice 6 and "version 44" for slice 7). As a result of this update, slices 4-7 are now owned by system 602, where the updates are asynchronously replicated to system 604. Because the number of slices that are now owned by system 602, the ownership of node 649*b* may be changed to system 602 from system 604. This may happen as a result of more frequent updates by one system (e.g., system 602) to data stored by another (e.g., system 604).

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
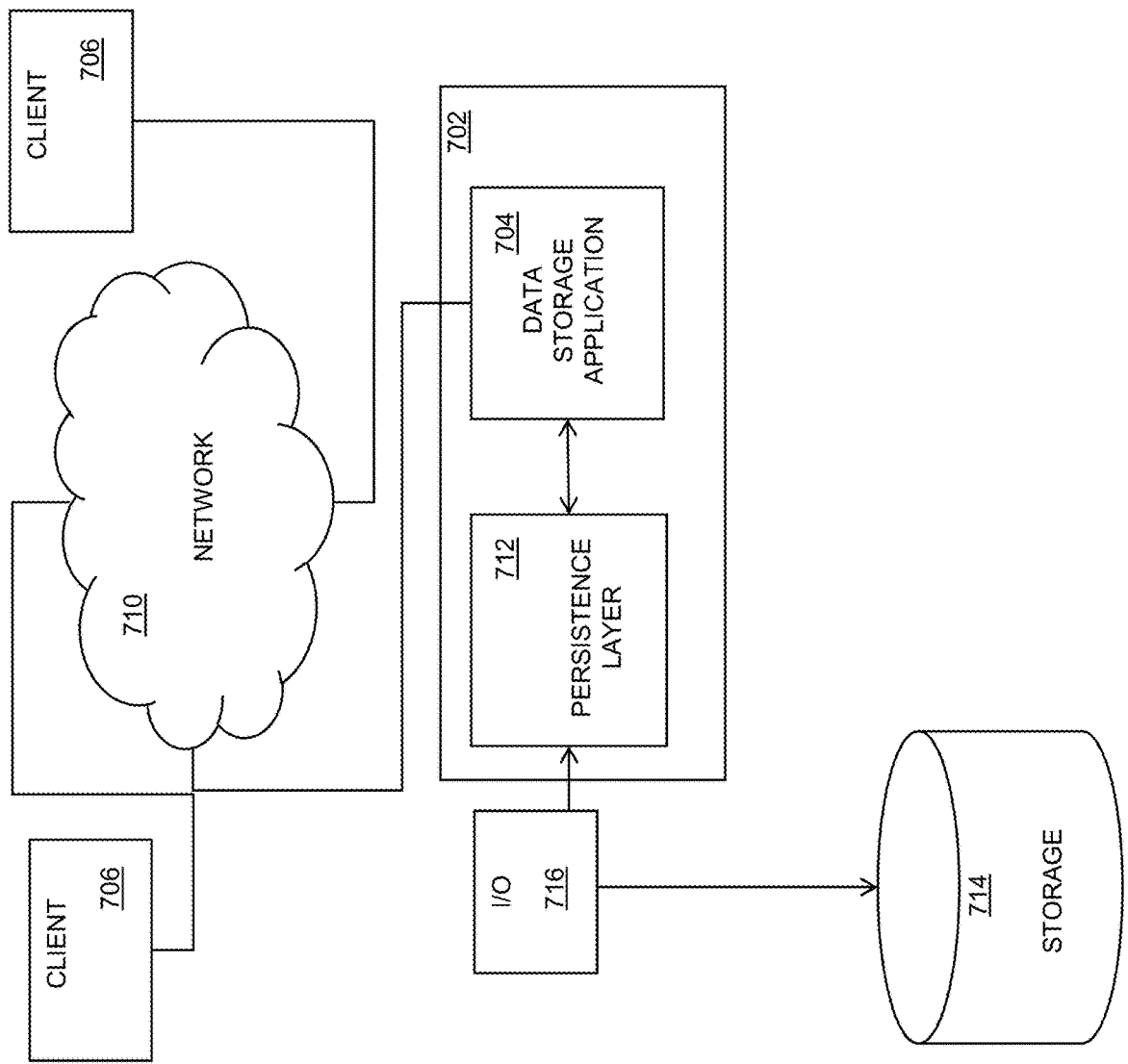
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
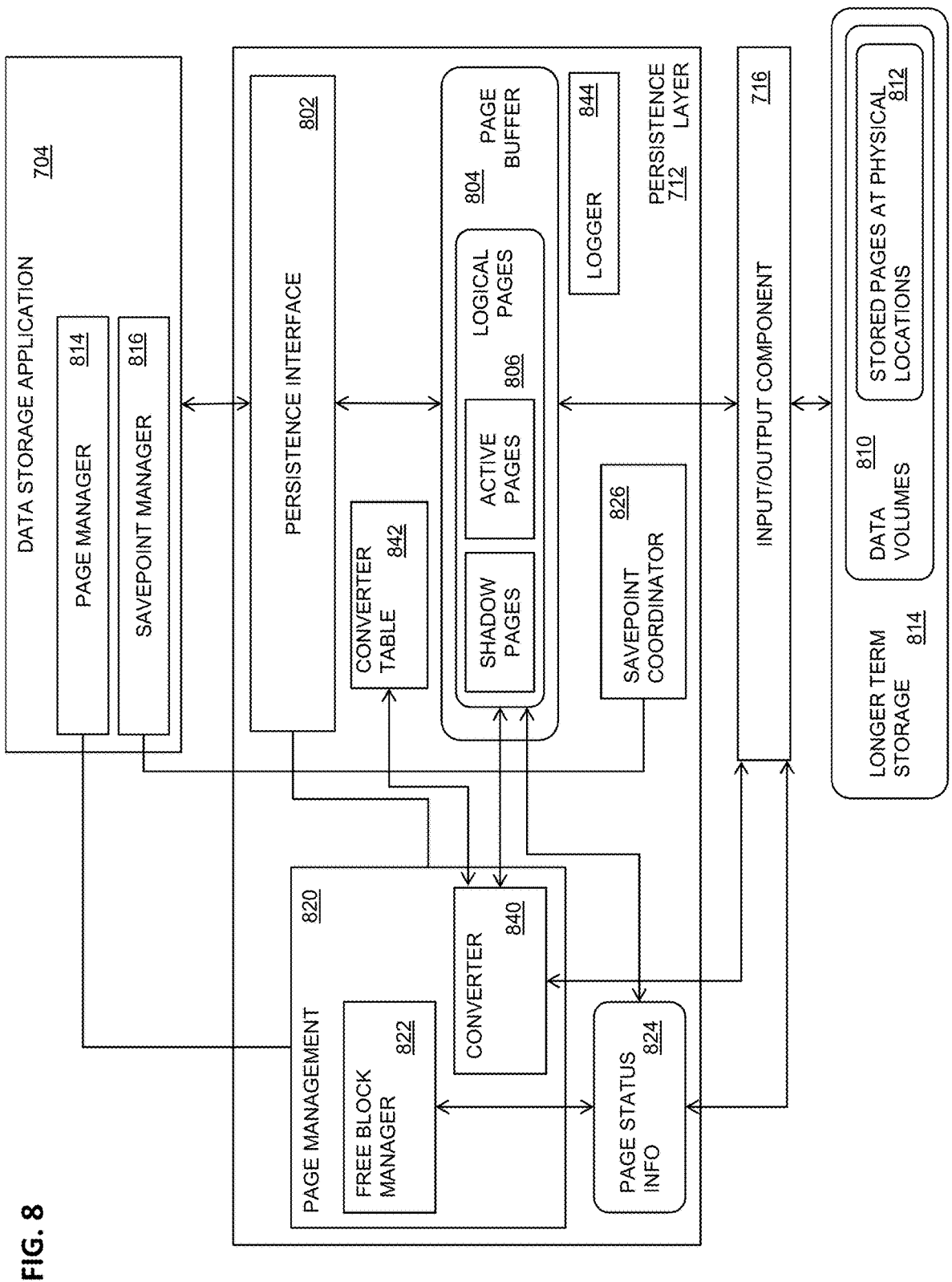
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
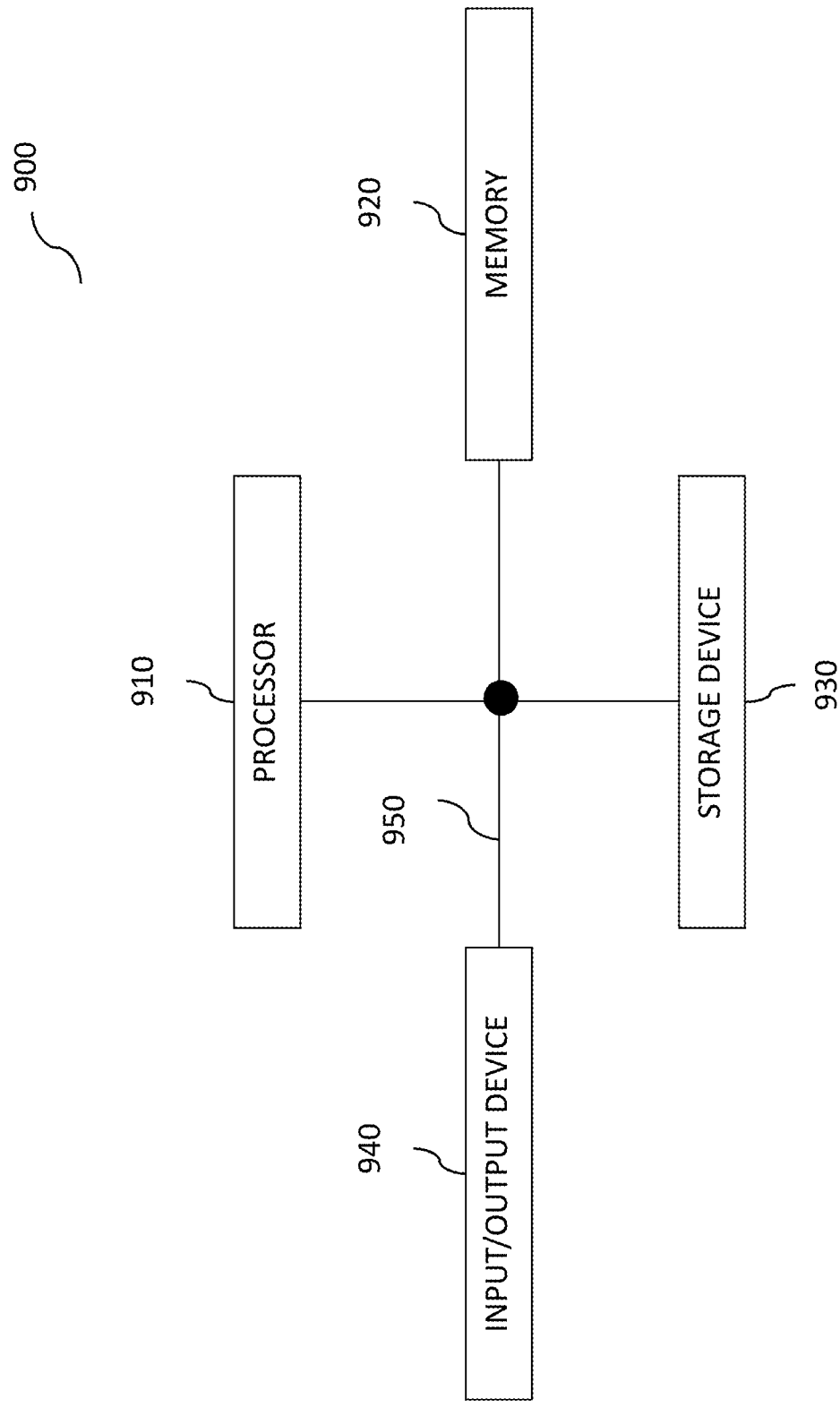
FIG. 9 is an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit.

The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
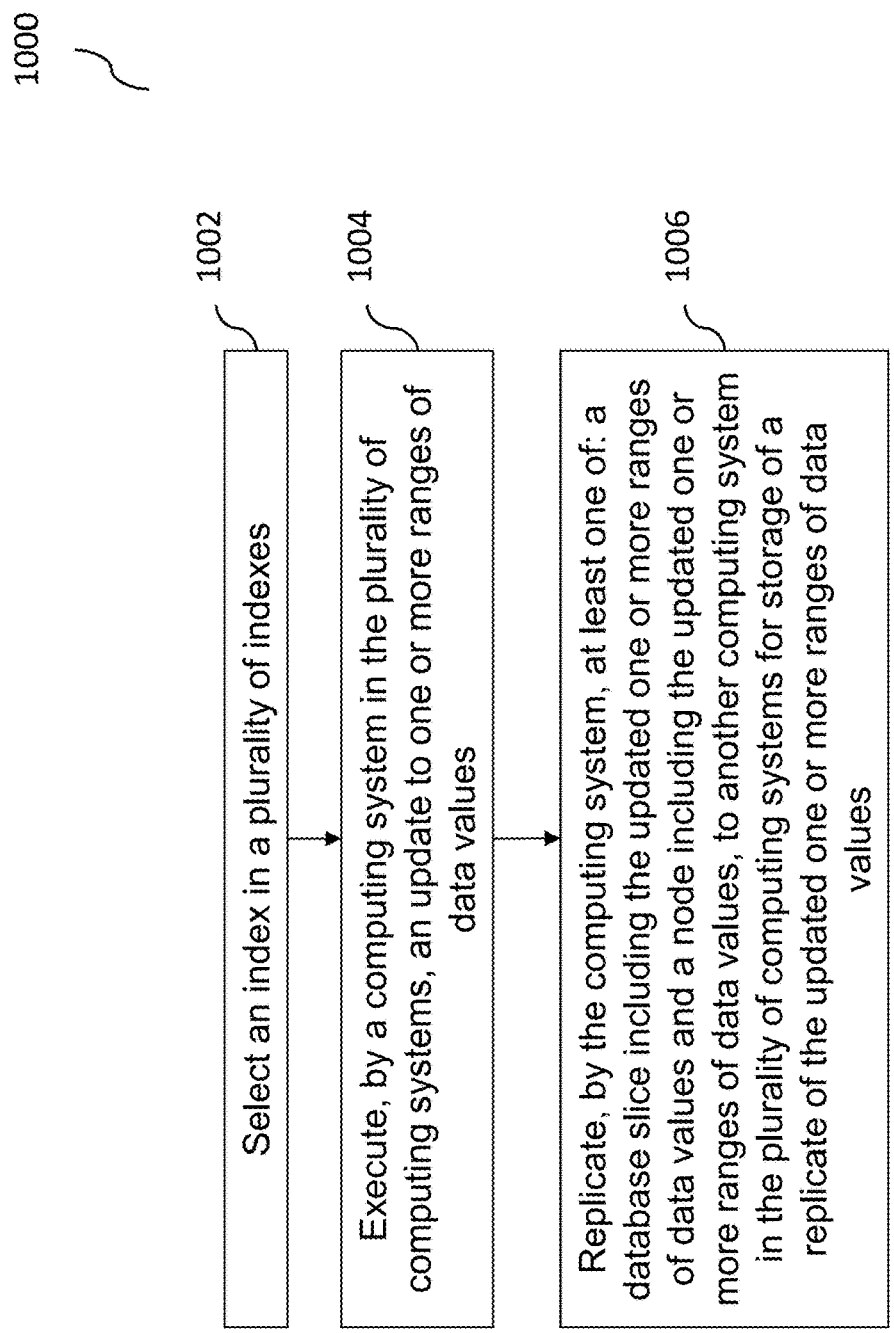
FIG. 10 is an exemplary method, according to some implementations of the current subject matter.

FIG. 10 illustrates an exemplary method 1000 for executing management of data ownership, according to some implementations of the current subject matter. At 1002, an index (e.g., index "id" at system 602 or 604 shown in FIGS. 6a-c)) in a plurality of indexes may be selected. The index may correspond to a plurality of ranges of data values stored in a plurality of database slices (e.g., slices 1-5 shown in FIG. 4) of a database. The index corresponding to a partitioning structure (e.g., structure 412 shown in FIG. 4) may include a plurality of hierarchically arranged nodes (e.g., nodes 413, 415, etc.). Each node may correspond to a range of data values in the plurality of ranges of data values stored in at least one database slice. The partitioning structure may be replicated across a plurality of computing systems (e.g., systems 602, 604, as shown in FIGS. 6a-c). At 1004, a computing system (e.g., system 604) may execute an update to one or more ranges of data values (e.g., an update to a range of data values in nodes 647b, new branch or node 649b, new slices 6, 7, etc.). At 1006, the computing system may replicate at least one of: a database slice including the updated one or more ranges of data values and a node including the updated one or more ranges of data values, to another computing system (e.g., system 602) in the plurality of computing systems for storage of a replicate of the updated one or more ranges of data values.

In some implementations, the current subject matter can include one or more of the following optional features. In some implementations, the replication may include replicating the node including the updated one or more ranges of data values to the other computing system based on a number of updates to the one or more ranges of data values being greater than a predetermined threshold number of updates.

In some implementations, the update execution may include generating another database slice configured to store the updated one or more ranges of data values. The method may further include replicating, by the computing system, the generated another database slice to the other database system. The method may also include storing the generated other database slice by another computing, executing, by another computing system, an update to one or more ranges of data values in another database slice, and replicating, by another computing system, another database slice to the computing system and storing a replica of the updated one or more ranges of data values in another database slice by the computing system.

In some implementations, one or more slices in the plurality of slices may be configured to be owned by one or more computing systems in the plurality of computing systems independently of one or more nodes in the plurality of hierarchically arranged nodes. Ownership of one or more slices may be configured to be transferred independently of ownership of one or more nodes by one or more computing systems.

In some implementations, the replication may include an asynchronous replication.

In some implementations, execution of an update may include at least one of the following: an insertion of the update to one or more ranges of data values into one or more database slices, modification of data stored in one or more database slices using the update to one or more ranges of data values, deletion of data one or more database slices, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   selecting an index in a plurality of indexes, the index corresponding to a plurality of ranges of data values stored in a plurality of database slices of a database, the index corresponding to a partitioning structure including a plurality of hierarchically arranged nodes, each node corresponding to a range of data values in the plurality of ranges of data values stored in at least one database slice, the partitioning structure being replicated across a plurality of computing systems;
   executing, by a computing system in the plurality of computing systems, an update to one or more ranges of data values; and
   replicating, by the computing system, at least one of: a database slice including the updated one or more ranges of data values and a node including the updated one or more ranges of data values, to another computing system in the plurality of computing systems for storage of a replicate of the updated one or more ranges of data values;
   the executing including
      determining that the computing system updated a first plurality of slices of a branch of hierarchically arranged nodes in the plurality of hierarchically arranged nodes owned by the another computing system, the first plurality of slices exceeding a first predetermined slice threshold, wherein the computing system updated each slice in the first plurality of slices a number of times exceeding a second predetermined threshold, and
      transferring the ownership of the branch of hierarchically arranged nodes from the another computing system to the computing system.

2. The method according to claim 1, wherein the replicating includes replicating the node including the updated one or more ranges of data values to the another computing system based on a number of updates to the one or more ranges of data values being greater than a predetermined threshold number of updates.

3. The method according to claim 1, wherein the executing includes generating another database slice configured to store the updated one or more ranges of data values.

4. The method according to claim 1, wherein one or more slices in the plurality of slices is configured to be owned by one or more computing systems in the plurality of computing systems independently of one or more nodes in the plurality of hierarchically arranged nodes, wherein ownership of one or more slices is configured to be transferred independently of ownership of the one or more nodes in the plurality of hierarchically arranged nodes by one or more computing systems.

5. The method according to claim 3, further comprising replicating, by the computing system, the generated another database slice to the another database system.

6. The method according to claim 5, further comprising
   storing the generated another database slice by the another computing;
   executing, by the another computing system, an update to one or more ranges of data values in the another database slice; and
   replicating, by the another computing system, the another database slice to the computing system and storing a replica of the updated one or more ranges of data values in the another database slice by the computing system.

7. The method according to claim 1, wherein the replicating includes an asynchronous replicating.

8. The method according to claim 1, wherein the executing includes at least one of the following: an insertion of the update to one or more ranges of data values into one or more database slices, modification of data stored in one or more database slices using the update to one or more ranges of data values, deletion of data one or more database slices, and any combination thereof.

9. A system comprising:
   at least one programmable processor; and
   a non-transitory machine-readable medium storing instructions that, when executed by the at least one programmable processor, cause the at least one programmable processor to perform operations comprising:
      selecting an index in a plurality of indexes, the index corresponding to a plurality of ranges of data values stored in a plurality of database slices of a database, the index corresponding to a partitioning structure including a plurality of hierarchically arranged nodes, each node corresponding to a range of data values in the plurality of ranges of data values stored in at least one database slice, the partitioning structure being replicated across a plurality of computing systems;
      executing, by a computing system in the plurality of computing systems, an update to one or more ranges of data values; and
      replicating, by the computing system, at least one of: a database slice including the updated one or more ranges of data values and a node including the updated one or more ranges of data values, to another computing system in the plurality of computing systems for storage of a replicate of the updated one or more ranges of data values;
      the executing including
         determining that the computing system updated a first plurality of slices of a branch of hierarchically arranged nodes in the plurality of hierarchically arranged nodes owned by the another computing system, the first plurality of slices exceeding a first predetermined slice threshold, wherein the computing system updated each slice in the first plurality of slices a number of times exceeding a second predetermined threshold, and
         transferring the ownership of the branch of hierarchically arranged nodes from the another computing system to the computing system.

10. The system according to claim 9, wherein the replicating includes replicating the node including the updated one or more ranges of data values to the another computing system based on a number of updates to the one or more ranges of data values being greater than a predetermined threshold number of updates.

11. The system according to claim 9, wherein the executing includes generating another database slice configured to store the updated one or more ranges of data values.

12. The system according to claim 9, wherein one or more slices in the plurality of slices is configured to be owned by one or more computing systems in the plurality of computing systems independently of one or more nodes in the plurality of hierarchically arranged nodes, wherein ownership of one or more slices is configured to be transferred independently of ownership of the one or more nodes in the plurality of hierarchically arranged nodes by one or more computing systems.

13. The system according to claim 11, wherein the operations further comprise replicating, by the computing system, the generated another database slice to the another database system.

14. The system according to claim 13, wherein the operations further comprise
storing the generated another database slice by the another computing;
executing, by the another computing system, an update to one or more ranges of data values in the another database slice; and
replicating, by the another computing system, the another database slice to the computing system and storing a replica of the updated one or more ranges of data values in the another database slice by the computing system.

15. The system according to claim 9, wherein the replicating includes an asynchronous replicating.

16. The system according to claim 9, wherein the executing includes at least one of the following: an insertion of the update to one or more ranges of data values into one or more database slices, modification of data stored in one or more database slices using the update to one or more ranges of data values, deletion of data one or more database slices, and any combination thereof.

17. A computer program product comprising a non-transitory machine-readable medium storing instructions that, when executed by at least one programmable processor, cause the at least one programmable processor to perform operations comprising:
selecting an index in a plurality of indexes, the index corresponding to a plurality of ranges of data values stored in a plurality of database slices of a database, the index corresponding to a partitioning structure including a plurality of hierarchically arranged nodes, each node corresponding to a range of data values in the plurality of ranges of data values stored in at least one database slice, the partitioning structure being replicated across a plurality of computing systems;
executing, by a computing system in the plurality of computing systems, an update to one or more ranges of data values; and
replicating, by the computing system, at least one of: a database slice including the updated one or more ranges of data values and a node including the updated one or more ranges of data values, to another computing system in the plurality of computing systems for storage of a replicate of the updated one or more ranges of data values;
the executing including
determining that the computing system updated a first plurality of slices of a branch of hierarchically arranged nodes in the plurality of hierarchically arranged nodes owned by the another computing system, the first plurality of slices exceeding a first predetermined slice threshold, wherein the computing system updated each slice in the first plurality of slices a number of times exceeding a second predetermined threshold, and
transferring the ownership of the branch of hierarchically arranged nodes from the another computing system to the computing system.

18. The computer program product according to claim 17, wherein the replicating includes replicating the node including the updated one or more ranges of data values to the another computing system based on a number of updates to the one or more ranges of data values being greater than a predetermined threshold number of updates.

19. The computer program product according to claim 17, wherein the executing includes generating another database slice configured to store the updated one or more ranges of data values.

20. The computer program product according to claim 17, wherein one or more slices in the plurality of slices is configured to be owned by one or more computing systems in the plurality of computing systems independently of one or more nodes in the plurality of hierarchically arranged nodes, wherein ownership of one or more slices is configured to be transferred independently of ownership of the one or more nodes in the plurality of hierarchically arranged nodes by one or more computing systems.

* * * * *